(12) United States Patent
Ohta

(10) Patent No.: US 7,948,129 B2
(45) Date of Patent: May 24, 2011

(54) CONDUCTIVE CONNECTING MEMBER AND ELECTRIC MOTOR

(75) Inventor: Minoru Ohta, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 12/402,071

(22) Filed: Mar. 11, 2009

(65) Prior Publication Data
US 2009/0243409 A1 Oct. 1, 2009

(30) Foreign Application Priority Data

Mar. 28, 2008 (JP) ................................. 2008-086272

(51) Int. Cl.
*H02K 11/00* (2006.01)
(52) U.S. Cl. .......................................................... 310/71
(58) Field of Classification Search ...................... 310/71
See application file for complete search history.

(56) References Cited

U.S. PATENT DOCUMENTS
7,719,148 B2 * 5/2010 Okada et al. .................... 310/71

FOREIGN PATENT DOCUMENTS
JP 55-170765 U 12/1980
JP 55170765 * 12/1980 ...................... 310/71
JP 2005-229677 A 8/2005

* cited by examiner

*Primary Examiner* — Quyen Leung
*Assistant Examiner* — Leda Pham
(74) *Attorney, Agent, or Firm* — Arent Fox, LLP

(57) ABSTRACT

A conductive connecting member is connected to electric wire with insulating coating by a fusing process so that electric continuity therebetween is ensured. The conductive connecting member includes a connecting section and a groove portion. The connecting section is formed by being bent so as to have an inner surface including a bottom surface and both side surfaces to be bonded to the electric wire. The groove portion is formed in the inner surface of the connecting section. The groove portion has a longitudinal groove extending in a direction of the inner surface intersecting with a longitudinal direction of the electric wire. The groove portion is positioned substantially at a center of the longitudinal direction of the electric wire. The groove portion may further have an inclined groove obliquely extending from the longitudinal groove or a transverse groove extending substantially perpendicular to the longitudinal groove.

9 Claims, 4 Drawing Sheets

CONDUCTIVE CONNECTING MEMBER AND ELECTRIC MOTOR

CROSS-REFERENCE TO RELATED APPLICATION

The present disclosure relates to subject matter contained in Japanese Patent Application No. 2008-086272, filed on Mar. 28, 2008, the disclosure of which is expressly incorporated herein by reference in its entirety.

BACKGROUND OF THE INVENTION

1. Field of the Invention

The present invention relates to a conductive connecting member connected to electric wire with insulating coating by a fusing process so that electric continuity is ensured, and an electric motor provided with the conductive connecting member.

2. Description of the Related Art

There is an electric motor (or motor) used for a hybrid vehicle or the like. This electric motor includes a stator having a plurality of stator cores formed so as to be divided in a circumferential direction, and a rotor rotatably placed relative to the stator, as disclosed in Japanese Patent Application Publication No. 2005-229677, for example. A stator coil (winding) is wound up around each stator core. Further, a bus ring for connecting the stator coils of the respective phases to each other is placed on an outer circumference of the stator. A conductive connecting member (conductive connecting terminal) for electrically connecting a terminal of the bus ring to a winding end of the stator coil is placed at an outer circumference side of the stator coil. This conductive connecting member is a strip-like member made of metallic material. The conductive connecting member has a connecting section for connecting a terminal of the bus ring thereto at one end, and a connecting section for connecting the winding end of the stator coil thereto at the other end. Each of these connecting sections is a portion formed by bending end portions of the conductive connecting member so that a cross section thereof becomes a U shape.

Now, of stator coils and electric wire of bus rings, there are ones with insulating coating on a surface thereof. In the case where a winding end of a stator coil or a terminal of a bus ring using electric wire with such insulating coating is bonded to a conductive connecting member, a fusing (thermal caulking) process for conducting a bonding point is required. In the fusing process, the electric wire is held by being clipped inside a U-shaped connecting section to pressurize the connecting section from both sides, and at that state, a current for fusing flows between the connecting section and the electric wire. This causes insulating coating of a surface of the electric wire to be melted, whereby a bonded surface is welded (fused).

In the fusing process as described above, insulating coating melted on the bonded surface between a conductive connecting terminal and the electric wire becomes a product containing carbide and the like, called sludge (in this specification, called "carbonized insulator"). This carbonized insulator is stuck mainly around the bonded surface between the conductive connecting terminal and the electric wire, but remains on the bonded surface. This causes electrical resistance of the bonded surface between the conductive connecting terminal and the electric wire to become large, and therefore, there has been a fear to bring the generation of heat at a bonding point or drop of efficiency of the electric motor. Further, joint strength between the conductive connecting terminal and the electric wire is lacking, whereby vibration resistance is lowered, or corrosion by aging degradation occurs easily. There has been a fear that this has an influence on durability of the electric motor. For that reason, there is need to eliminate carbonized insulator generated in a fusing process from a bonded surface between a conductive connecting terminal and electric wire as much as possible.

SUMMARY OF THE INVENTION

The present invention is made in view of the above points, and it is an object of the present invention to provide a conductive connecting member capable of effectively eliminating carbonized insulator generated by melting of insulating coating by a fusing process from a bonded surface to the electric wire, and an electric motor provided with the conductive connecting member.

In order to solve the above problem, in one aspect of the present invention, a conductive connecting member according to the present invention is a conductive connecting member (20) to be connected to electric wire (18) with insulating coating by a fusing process so that electric continuity therebetween is ensured, the conductive connecting member (20) including: a connecting section (21) formed by being bent so as to have an inner surface (22) including a bottom surface (22a) and both side surfaces (22b, 22b) to be bonded to the electric wire (18); and a groove portion (25) formed in the inner surface (22) of the connecting section (21), wherein the groove portion (25) has a longitudinal groove (26) extending in a direction of the inner surface (22) intersecting with a longitudinal direction of the electric wire (18), and the groove portion (25) is positioned substantially at a center of the longitudinal direction.

In this regard, reference numerals in parenthesis here are shown as one example of the present invention to indicate reference numerals of corresponding components of an embodiment (will be described later).

According to the conductive connecting member of the present invention, the groove portion is formed in the inner surface of the connecting section. Thus, it becomes possible to remove carbonized insulator, generated on the bonded surface to the electric wire during the fusing process, to the outside of the bonded surface via this groove portion. In particular, the groove portion of the conductive connecting member according to the present invention has the longitudinal groove positioned substantially at the center of the longitudinal direction of the electric wire in the inner surface of the connecting section and extending in the direction intersecting with the longitudinal direction. Thus, it is possible to eliminate the carbonized insulator generated on the bonded surface via the longitudinal groove extremely effectively. Therefore, it is possible to prevent the carbonized insulator from remaining on the bonded surface to the electric wire. This makes it possible to inhibit the generation of heat by ensuring conductivity of the bonding point, and to prevent efficiency of an electric motor provided with this conductive connecting member from being lowered. In addition, since it is possible to prevent lack of joint strength relative to the electric wire, it is possible to improve vibration resistance of the electric motor and the like.

Further, in the conductive connecting member of the present invention, the longitudinal groove (26) may be caused to extend to the end portions (23, 23) of the connecting section (21). This makes it possible to remove the carbonized insulator in the longitudinal groove to the outside of the bonded surface easily. Thus, it becomes possible to remove the carbonized insulator generated on the bonded surface to the electric wire more effectively.

Further, in the conductive connecting member of the present invention, the groove portion may further have an inclined groove (27) obliquely extending from the longitudinal groove (26) toward each of end portions (23, 23) opposite to the bottom surface (22a). Alternatively, in the conductive connecting member, the groove portion may further have a transverse groove (28) extending from the longitudinal groove (26) in a direction substantially perpendicular to the longitudinal groove (26). Thus, by having the inclined groove or the transverse groove in addition to the longitudinal groove, it is possible to remove carbonized insulator generated on the bonded surface of the electric wire further effectively. In particular, if the conductive connecting member has the inclined groove obliquely extending from the longitudinal groove toward the end portions opposite to the bottom surface, it is possible to introduce the carbonized insulator generated on the bonded surface to the end portions of the connecting section via the inclined groove. Thus, it becomes possible to remove the carbonized insulator of the bonded surface extremely effectively.

Further, in the conductive connecting member of the present invention, it is preferable that the groove portion (25) has at least a volume that can receive carbonized insulator generated from the bonded surface (A) of the electric wire (18) by melting of the insulating coating in the fusing process. This makes it possible to receive the total amount of carbonized insulator generated from the bonded surface with the groove portion. Thus, it is possible to prevent the carbonized insulator from remaining on the bonded surface more effectively. In this case, so long as the groove portion has the minimum volume capable of receiving the carbonized insulator generated from the bonded surface, the groove portion may have a volume more than the minimum volume. By having this minimum volume, it is possible to ensure a bonding area between the conductive connecting member and the electric wire required to keep electric continuity and joint strength of the bonding portion.

Further, in another aspect of the present invention, an electric motor according to the present invention is an electric motor including a conductive connecting member (20, 40), the conductive connecting member (20, 40) being connected to electric wire (18) with insulating coating of winding (15, 16) by a fusing process so that electric continuity therebetween is ensured, wherein the conductive connecting member (20, 40) is the conductive connecting member described above. According to this electric motor, it is possible to inhibit the generation of heat at a bonding point between the electric wire of the winding and the conductive connecting member, and this makes it possible to prevent efficiency of the electric motor from being lowered. Further, since it is possible to ensure joint strength necessary for the bonding point, it is possible to improve vibration resistance and durability of the electric motor.

According to the conductive connecting member of the present invention, it is possible to effectively eliminate carbonized insulator generated by melting of insulating coating in a fusing process from a bonded surface to electric wire.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 3 is a view showing concrete examples of a groove portion, in which

FIG. 4 is a view showing cross-sectional shapes of the groove portion, in which

DETAILED DESCRIPTION OF THE INVENTION

Figure 1:
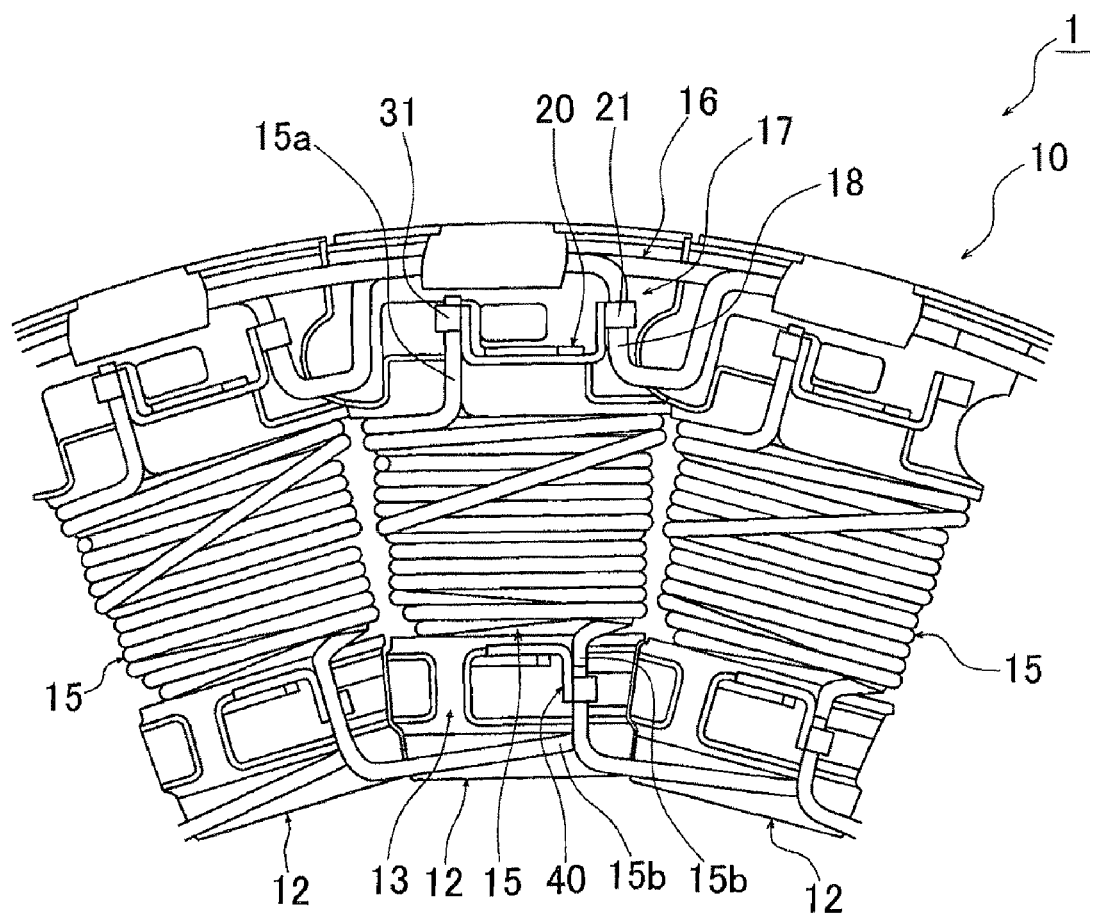
FIG. 1 is a partially enlarged view showing a part of a stator provided in a motor according to one embodiment of the present invention.

Hereinafter, an embodiment of the present invention will be described with reference to the accompanying drawings. FIG. 1 is a partially enlarged view showing a part of a stator 10 provided in an electric motor (hereinafter, referred to as "motor") 1 according to one embodiment of the present invention. The motor 1 of the present embodiment is used for a hybrid vehicle. Although detailed illustration is omitted, the motor 1 is placed so as to share an axis line with a crank shaft of an internal combustion engine (engine) and a transmission. The stator 10 is fixed to the engine via housing and a rotor (not shown in the drawings) rotatable relative to the stator 10 is coupled to each of the crank shaft of the engine and the transmission. The motor 1 assists the engine in driving by supplying electric power thereto from a battery. Further, the motor 1 is adapted to operate as an electric generator by causing rotation of wheels to be transmitted when speed of a vehicle is reduced, thereby regenerating part of kinetic energy to electric power.

As shown in FIG. 1, the stator 10 is provided with a plurality of stator cores 12 formed so as to protrude inward in a radial direction. The stator cores 12 are arranged along a circumferential direction. A stator coil (winding) 15 is wound on each of the stator cores 12 via an insulator 13 having insulation properties. A bus ring (distribution winding) 16 is placed at a position along an outer circumference of the stator 10. The bus ring 16 has bus ring terminals 17 by being subjected to bending processing so as to protrude from a main frame having substantially a ring shape inward in a radial direction. Then, a conductive connecting terminal (conductive connecting member) 20 for connecting the bus ring terminal 17 to a winding end 15a of the stator coil 15 is attached to the outer circumference side of each of the stator coils 15.

In this regard, another conductive connecting terminal (conductive connecting member) 40 is attached to an inner circumference side of each of the stator coils 15. The conductive connecting terminal 40 has connecting sections (detail illustration of which is omitted) at both ends in the similar to the concrete configuration of the conductive connecting terminal 20 (will be described later). A winding end 15b at the inner circumference side of the stator coil 15 is connected to one connecting section, while a winding end 15b at an inner circumference side of the adjacent stator coil 15 is connected to the other connecting section. Thus, the winding ends 15b at the inner circumference side of the respective stator coils 15 are connected over the whole circumference of the stator 10. By connecting part of the winding ends 15*b* to an earth terminal (not shown in the drawings), middle point connection of the respective stator coils 15 is implemented.

Figure 2:
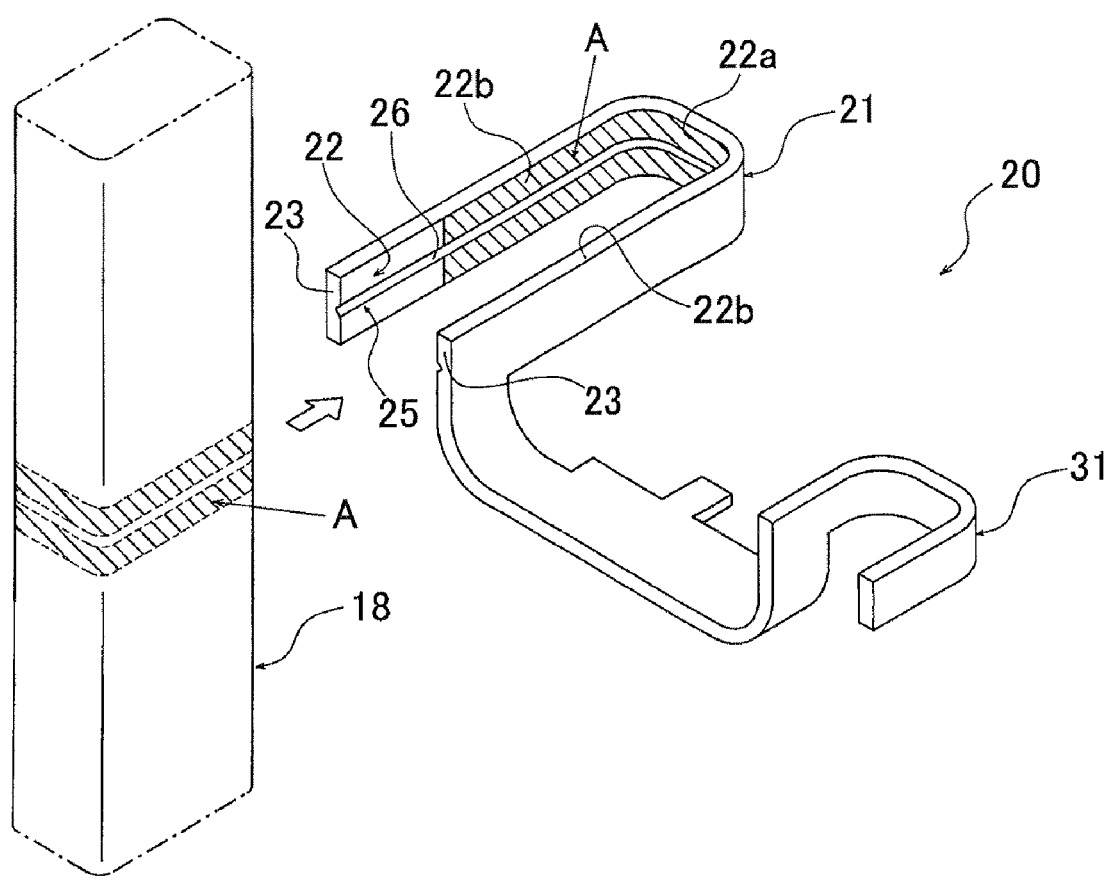
FIG. 2 is a perspective view showing a conductive connecting terminal.
Figure 3A:
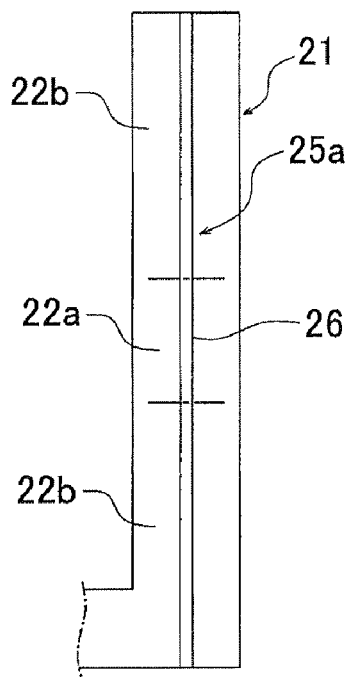
FIG. 3A is a view showing a groove portion composed of one longitudinal groove.
Figure 3B:
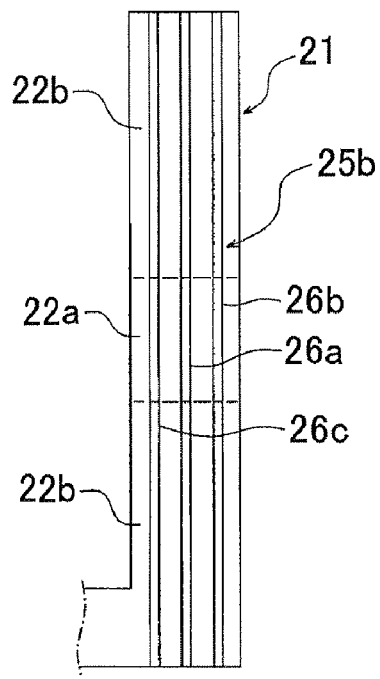
FIG. 3B is a view showing a groove portion having three longitudinal grooves.
Figure 3C:
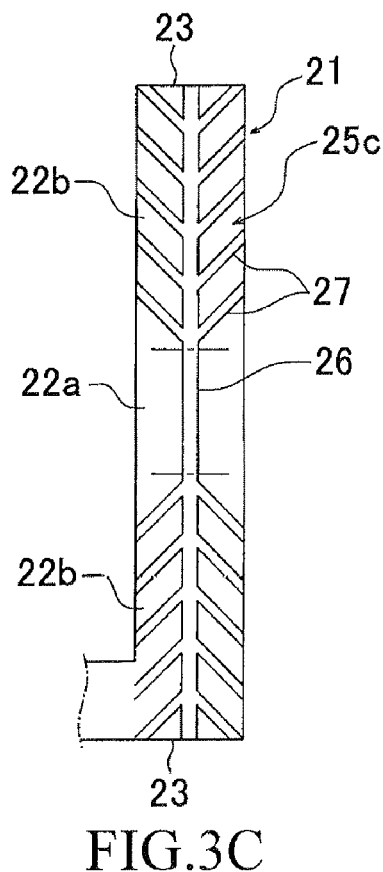
FIG. 3C is a view showing a branch-shaped groove portion.
Figure 3D:
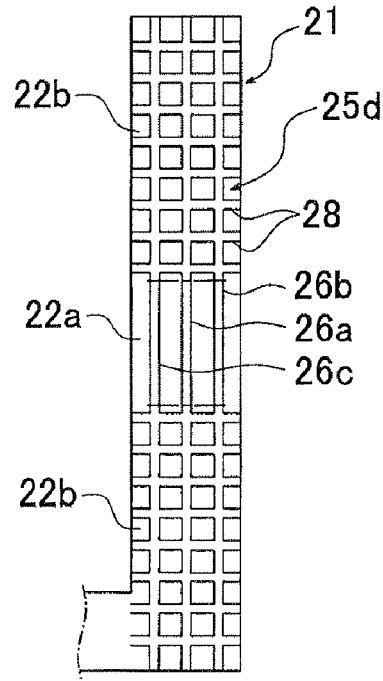
FIG. 3D is a view showing a lattice-shaped groove portion.

FIG. 2 is a perspective view showing the conductive connecting terminal 20. The conductive connecting terminal 20 is one formed by bending a strip-like member made of metallic material. The conductive connecting terminal 20 has a connecting section 21 for connecting electric wire 18 of the bus ring terminal 17 thereto at one end, and has a connecting section 31 for connecting the winding end 15*a* of the stator coil 15 thereto at the other end. The connecting section 21 is composed of a portion formed so as to have an inner surface 22 including a bottom surface 22*a* and both side surfaces 22*b*, 22*b* by bending one end portion of the conductive connecting terminal 20 along a longitudinal direction so that a cross section thereof is substantially a U shape. This connecting section 21 is adapted to hold the electric wire 18 by bonding the bottom surface 22*a* and both the side surfaces 22*b*, 22*b* to a circumference of the electric wire 18. In this regard, the connecting section 31 is also a portion formed by bending the other end portion of the conductive connecting terminal 20 so that a cross section thereof is substantially a U shape. The connecting section 31 is adapted to hold the winding end 15*a* on an inner side thereof in the similar manner to the connecting section 21.

A groove portion 25 is formed in the inner surface 22 of the connecting section 21. The groove portion 25 is composed of one linear groove (hereinafter, referred to as the "longitudinal groove") 26 positioned substantially at a center of a width direction of the connecting section 21 (longitudinal direction of the electric wire 18) and extending in a direction perpendicular to the longitudinal direction of the electric wire 18. This longitudinal groove 26 extends from the bottom surface 22*a* in the inner surface 22 of the connecting section 21 to each of open ends (U-shaped end portions) 23, 23 of the connecting section 21 through both the side surfaces 22*b*, 22*b*.

FIG. 3 is a view showing concrete examples of the groove portion 25. In this regard, FIG. 3 shows a state where the inner surface 22 of the connecting section 21 is developed. A groove portion 25*a* shown in FIG. 3A is a groove portion 25 composed of the longitudinal groove 26 shown in FIG. 2. A groove portion 25*b* shown in FIG. 3B has the total three longitudinal grooves 26 by forming, in addition to the longitudinal groove 26*a* arranged at the center of the inner surface 22 in the width direction, two longitudinal grooves 26*b*, 26*c* parallel to the longitudinal groove 26*a* at both sides of the longitudinal groove 26*a*. Further, in a groove portion 25*c* shown in FIG. 3C, inclined grooves 27 each obliquely extending toward the open ends 23, 23, which are end portions opposite to the bottom surface 22*a*, from the longitudinal groove 26 are further formed in addition to the central longitudinal groove 26. The plurality of inclined grooves 27 arranged parallel to each other are arranged at both sides of the longitudinal groove 26, whereby the groove portion 25*c* having a branch-like shape are configured by the central longitudinal groove 26 and the inclined grooves 27 at both sides thereof. In this regard, an edge of each inclined groove 27 extends to a side end of the connecting section 21 in the width direction or the open ends 23, 23. Further, in a groove portion 25*d* shown in FIG. 3D, transverse grooves 28 each extending in a direction substantially orthogonal to a central longitudinal groove 26*a* and longitudinal grooves 26*b*, 26*c* at both sides (longitudinal direction of the electric wire 18) are further formed. The plurality of transverse grooves 28 are arranged parallel to each other at predetermined intervals, whereby the lattice-shaped groove portion 25*d* is configured by the longitudinal grooves 26*a* to 26*c* and the transverse grooves 28. In this regard, an edge of each transverse groove 28 extends to a side end of the connecting section 21 in the width direction.

Figure 4A:
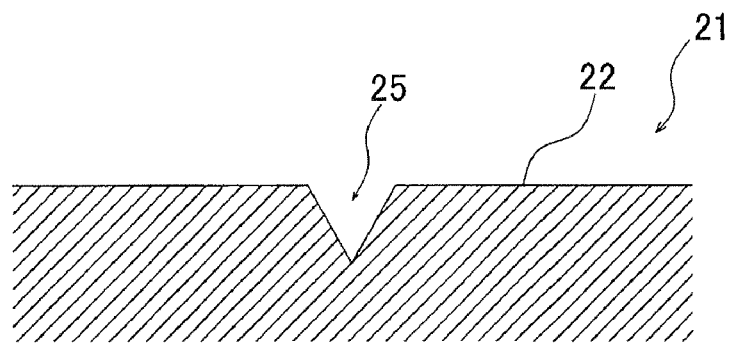
FIG. 4A is a view showing a groove portion having substantially a V-shaped cross section.
Figure 4B:
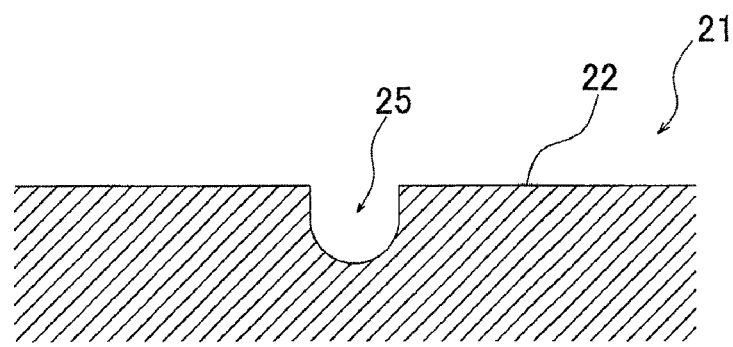
FIG. 4B is a view showing a groove portion having substantially a U-shaped cross section.

FIG. 4 is a view showing a cross-sectional shape of the groove portion 25. A cross section of the groove portion 25 can be not only substantially a V shape, as shown in FIG. 4A, but also substantially a U shape, as shown in FIG. 4B. Further, it is preferable that a volume of the groove portion 25 ensures at least a volume that can receive the total amount of carbonized insulator generated from the bonded surface A (see FIG. 2) between the electric wire 18 and the connecting section 21 by a fusing process (will be described later). Therefore, a concrete dimension and shape of the groove portion 25 are determined by appropriately selecting a depth dimension, a width dimension, a length dimension, the number of grooves and the like thus required.

Figure 5:
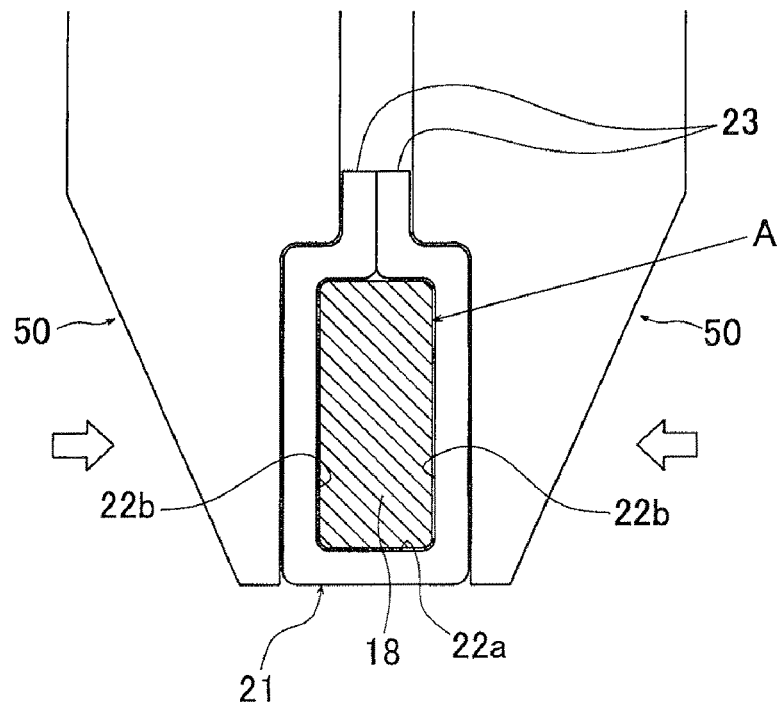
FIG. 5 is a view for explaining procedures of a fusing process.

FIG. 5 is a view for explaining procedures of a fusing process. In a fusing process, as shown in FIG. 5, the electric wire 18 is arranged inside the connecting section (U-shaped portion) 21, and the connecting section 21 is held between electrodes 50, 50 arranged at both outer sides of the connecting section 21 at that state. This causes the bottom surface 22*a* and both the side surfaces 22*b*, 22*b* of the connecting section 21 to be pressure-bonded around the electric wire 18. Further, by pressing the connecting section 21 from both right and left sides by means of the electrodes 50, 50, the open ends 23, 23 of the connecting section 21 abut on each other and deform until they become a state where a U-shaped opening is closed. In this regard, the open ends 23, 23 do not necessarily abut on each other so long as the interval is narrowed. There may be a space between the open ends 23, 23. Thus, so that the connecting section 21 is pressed by the electrodes 50, 50, a current for fusing flows between the connecting section 21 and the electric wire 18 via the electrodes 50, 50. This causes insulating coating on a surface of the electric wire 18 to be melted, whereby the bonded surface A between the conductive connecting terminal 20 and the electric wire 18 is welded (fused).

In the fusing process, the insulating coating melted on the bonded surface A of the electric wire 18 becomes carbonized insulator. This carbonized insulator is stuck mainly around the bonded surface A between the conductive connecting terminal 20 and the electric wire 18, but may remain on the bonded surface A heretofore. However, in the conductive connecting terminal 20 of the present embodiment, since the groove portion 25 is formed in the inner surface 22 of the connecting section 21, the carbonized insulator generated on the bonded surface A can be removed to the outside of the bonded surface A via the groove portion 25. This makes it possible to effectively prevent the carbonized insulator from remaining on the bonded surface A.

The inventor of the present invention prepared conductive connecting terminals 20 with groove portions 25*a* to 25*d* having the respective shapes shown in FIG. 3A to 3D, and made components in which pieces of the electric wire 18 are respectively connected to the connecting sections 21 of the conductive connecting terminals 20 by the fusing process. Then, a load capacity test in which tensile load is applied to each of the components in a direction to separate the electric wire 18 from the conductive connecting terminal 20 along a longitudinal direction of the electric wire 18 was carried out. As a result, the descending order of a load capacity value of the components is (c) the branch-shaped groove portion 25*c* having the inclined grooves 27, (a) the groove portion 25*a* having only one longitudinal groove 26, (d) the lattice-shaped groove portion 25d having the transverse grooves 28, and (b) the groove portion 25b having the three longitudinal grooves 26a to 26c. From this result, it found that, in order to eliminate carbonized insulator from the bonded surface A between the conductive connecting terminal 20 and the electric wire 18, it is most effective to form a branch-shaped groove portion 25c having a longitudinal groove 26 and inclined grooves 27 each obliquely extending from the longitudinal groove 26 toward open ends 23, 23. As a reason that the branch-shaped groove portion 25c is effective, it is thought that carbonized insulator flowing out from the bonded surface A to the groove portion 25 during the fusing process is introduced to the open ends 23, 23 of the connecting section 21 by the longitudinal groove 26 and the inclined grooves 27, and this makes it easier for the carbonized insulator to be removed to the outside of the bonded surface A.

In this regard, the inventor of the present invention suggests groove portions each having other shape in addition to the groove portions 25a to 25d shown in FIG. 3. Although illustration of them is omitted, the suggested groove portions include a groove portion in which only a plurality of inclined grooves each extending toward a direction oblique to the width direction of the connecting section 21 are provided without providing a longitudinal groove 26, and an oblique lattice-shaped groove portion in which other inclined grooves each having a shape symmetric about a plurality of inclined grooves in the width direction are added in addition to the inclined grooves, whereby they intersect with each other. Then, conductive connecting terminals 20 each having such a groove portion were prepared, and a load capacity test similar to the test described above was carried out. However, a load capacity value of each of the conductive connecting terminals 20 was lower compared with the groove portions respectively having the shapes shown in FIG. 3, superiority to eliminate carbonized insulator from the bonded surface A has not been recognized largely. For this reason, it found that the longitudinal groove 26 (26a) formed at the center of the connecting section 21 in the width direction fulfills an important role to eliminate the carbonized insulator of bonded surface A. Namely, if this longitudinal groove 26 does not exist, it is impossible to effectively eliminate the carbonized insulator generated on the bonded surface A, whereby the carbonized insulator easily remains on the bonded surface A. Therefore, in order to effectively eliminate the carbonized insulator from the bonded surface A between the conductive connecting terminal 20 and the electric wire 18, there is need to provide at least the longitudinal groove 26 at the center of the connecting section 21 in the width direction (longitudinal direction of the electric wire 18).

As explained above, according to the conductive connecting terminal 20 of the present embodiment, since the groove portion 25 is formed in the inner surface 22 of the connecting section 21, the carbonized insulator generated on the bonded surface A during the fusing process can be removed to the outside of the bonded surface A via the groove portion 25. This makes it possible to ensure conductivity of the bonded surface A, to inhibit the generation of heat, and to prevent efficiency of the motor 1 from being lowered. In addition, since it is possible to prevent lack of joint strength to the electric wire 18, this makes it possible to improve vibration resistance and durability of the motor 1.

In this regard, in the embodiment described above, the case where the groove portion 25 is formed in the connecting section 21 for connecting the conductive connecting terminal 20 to the electric wire 18 of the bus ring terminal 17 has been explained. However, the groove portion according to the present invention can also be formed in the connecting section 31 for connecting the conductive connecting terminal 20 to the winding end 15a of the stator coil 15. Moreover, in addition to the conductive connecting terminal 20 placed on the outer circumference of the stator coil 15, the present invention can also be applied to each connecting section of the conductive connecting terminal 40 placed on the inner circumference of the stator coil 15. Further, in the present invention, the electric wire to be connected to the connecting section of the conductive connecting member is not limited to so-called rectangular wire whose cross section is a rectangle. The electric wire may be circular wire whose cross section is a circle. Moreover, the number of pieces of electric wire to be connected to the connecting section is not limited to one. Plural pieces of electric wire may be connected to the connecting section. Furthermore, a concrete shape of the cross section of the connecting section is not limited to the U shape so long as it is a portion formed by being bent so as to have an inner surface including at least a bottom surface and both side surfaces. It may be other shape.

Further, with respect to the groove(s) that the groove portion 25 of the embodiment described above includes, the concrete number of grooves, concrete arrangement, a width dimension, a length dimension, a depth dimension, a shape and the like are merely one example, and the groove portion that the conductive connecting member according to the present invention has may have the other number of grooves, any arrangement, any width dimension, any length dimension, any depth dimension and any shape other than those in the above embodiment.

Although the embodiment of the present invention has been explained above, the present invention is not limited to the above embodiment. Various modifications can be made in a scope of the technical idea described in the following claims, the specification described above and the accompanying drawings without departing from the spirit and scope of the present invention. In this regard, even any shape, structure or material that is not described directly in the specification and the drawings falls within the technical idea of the present invention so long as the function and the effect of the present invention are achieved.

What is claimed is:

1. A conductive connecting member to be connected to electric wire with insulating coating by a fusing process so that electric continuity therebetween is ensured, the conductive connecting member comprising:
   a connecting section formed by being bent so as to have an inner surface including a bottom surface and both side surfaces to be bonded to the electric wire; and
   a groove portion formed in the inner surface of the connecting section,
   wherein the groove portion has a longitudinal groove extending in a direction of the inner surface intersecting with a longitudinal direction of the electric wire, has an inclined groove obliquely extending from the longitudinal groove toward an end portion opposite to the bottom surface, and is positioned substantially at a center of a width direction of the connecting section.

2. The conductive connecting member as claimed in claim 1, wherein the longitudinal groove extends to an end portion of the connecting section.

3. A conductive connecting member to be connected to electric wire with insulating coating by a fusing process so that electric continuity therebetween is ensured, the conductive connecting member comprising:

a connecting section formed by being bent so as to have an inner surface including a bottom surface and both side surfaces to be bonded to the electric wire; and a groove portion formed in the inner surface of the connecting section, wherein the groove portion has a longitudinal groove extending in a direction of the inner surface intersecting with a longitudinal direction of the electric wire, has a transverse groove extending from the longitudinal groove in a direction substantially perpendicular to the longitudinal groove, and is positioned substantially at a center of a width direction of the connecting section.

4. A conductive connecting member to be connected to electric wire with insulating coating by a fusing process so that electric continuity therebetween is ensured, the conductive connecting member comprising:

a connecting section formed by being bent so as to have an inner surface including a bottom surface and both side surfaces to be bonded to the electric wire; and a groove portion formed in the inner surface of the connecting section, wherein the groove portion has a longitudinal groove extending in a direction of the inner surface intersecting with a longitudinal direction of the electric wire, is positioned substantially at a center of a width direction of the connecting section, and has at least a volume that can receive carbonized insulator generated from the bonded surface of the electric wire by melting of the insulating coating in the fusing process.

5. An electric motor comprising a conductive connecting member, the conductive connecting member being connected to electric wire with insulating coating of winding by a fusing process so that electric continuity therebetween is ensured, wherein the conductive connecting member is the conductive connecting member as claimed in claim 1.

6. The conductive connecting member as claimed in claim 3, wherein the longitudinal groove extends to an end portion of the connecting section.

7. The conductive connecting member as claimed in claim 4, wherein the longitudinal groove extends to an end portion of the connecting section.

8. An electric motor comprising a conductive connecting member, the conductive connecting member being connected to electric wire with insulating coating of winding by a fusing process so that electric continuity therebetween is ensured, wherein the conductive connecting member is the conductive connecting member as claimed in claim 3.

9. An electric motor comprising a conductive connecting member, the conductive connecting member being connected to electric wire with insulating coating of winding by a fusing process so that electric continuity therebetween is ensured, wherein the conductive connecting member is the conductive connecting member as claimed in claim 4.

* * * * *